United States Patent
Poola et al.

(10) Patent No.: US 10,390,174 B2
(45) Date of Patent: Aug. 20, 2019

(54) METHODS AND SYSTEMS FOR MITIGATING THE IMPACT OF BEAMFORMING ON THE ACCURACY OF WI-FI BASED LOCATION TRACKING OF CLIENT DEVICES

(71) Applicant: Extreme Networks, Inc., San Jose, CA (US)

(72) Inventors: Jeelan Basha Poola, Karnataka (IN); Varun Tandon, Karnataka (IN); Senthilraj Shanmugavadivel, Coimbatore (IN)

(73) Assignee: EXTREME NETWORKS, INC., San Jose, CA (US)

( * ) Notice: Subject to any disclaimer, the term of this patent is extended or adjusted under 35 U.S.C. 154(b) by 0 days.

(21) Appl. No.: 14/844,151

(22) Filed: Sep. 3, 2015

(65) Prior Publication Data

US 2017/0070854 A1    Mar. 9, 2017

(51) Int. Cl.
*H04W 4/02* (2018.01)
*H04B 17/318* (2015.01)
*H04B 7/06* (2006.01)
*H04B 7/0404* (2017.01)

(52) U.S. Cl.
CPC .......... *H04W 4/023* (2013.01); *H04B 7/0617* (2013.01); *H04B 17/318* (2015.01); *H04B 7/0404* (2013.01)

(58) Field of Classification Search
None
See application file for complete search history.

(56) References Cited

U.S. PATENT DOCUMENTS

| | | | | |
|---|---|---|---|---|
| 2004/0224637 | A1* | 11/2004 | Silva | H04B 7/04 455/63.4 |
| 2013/0272264 | A1* | 10/2013 | Ning | H04W 36/24 370/331 |
| 2016/0323717 | A1* | 11/2016 | Friday | H04W 4/043 |
| 2016/0323754 | A1* | 11/2016 | Friday | H04W 16/28 |

* cited by examiner

*Primary Examiner* — Yemane Mesfin
*Assistant Examiner* — Jeff Banthrongsack
(74) *Attorney, Agent, or Firm* — Sterne, Kessler, Goldstein & Fox P.L.L.C.

(57) ABSTRACT

Methods and systems for mitigating the impact of beamforming on the accuracy of Wi-Fi based location tracking of client devices. An embodiment takes the form of a process that includes (a) obtaining a plurality of received signal strength indicator (RSSI) values respectively associated with frames in a plurality of frames that were (i) received by various access points in a plurality of access points and (ii) transmitted by a client device that is connected to a first access point in the plurality of access points; (b) segmenting the access points in the plurality of access points into (i) a beamforming-path set of one or more access points and (ii) a non-beamforming-path set of one or more access points; (c) identifying a location-determination subset of the obtained RSSI values; and (d) determining a location of the client device using the identified location-determination subset of the obtained RSSI values.

24 Claims, 6 Drawing Sheets

US 10,390,174 B2

METHODS AND SYSTEMS FOR MITIGATING THE IMPACT OF BEAMFORMING ON THE ACCURACY OF WI-FI BASED LOCATION TRACKING OF CLIENT DEVICES

BACKGROUND OF THE INVENTION

It is increasingly important to determine the location of wireless devices, such as smart phones, tablet computers, automobile computers, and the like. Some wireless location positioning systems work on the principle of comparing (i) cached received signal strength indicator (RSSI) values of wireless data frames transmitted from the wireless device with (ii) cached fingerprints of the RSSI values.

However, the traditional algorithms to determine the location of wireless devices are based on omnidirectional transmissions from the respective wireless devices. With the adoption of beamforming capable chipsets, wireless devices are capable of transmitting data frames in a directional beam at a higher signal strength than a traditional omnidirectional wireless transmission. Thus, wireless devices capable of beamforming transmissions exhibit a bias in the sensor observations as compared to the cached fingerprints, and the location-tracking accuracy consequently decreases.

Accordingly, there is a need for methods and systems for mitigating the impact of beamforming on the accuracy of Wi-Fi based location tracking of client devices.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
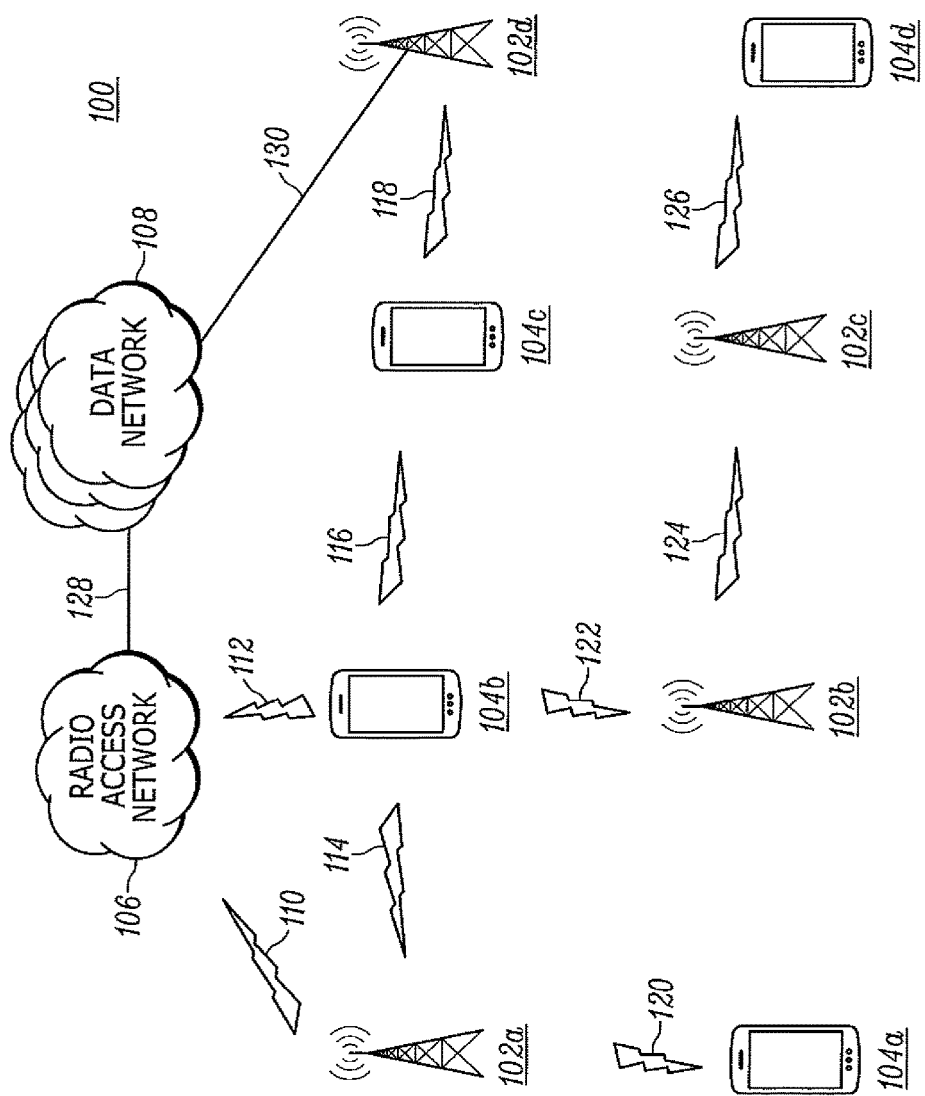
FIG. 1 is a schematic of a wireless network, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment takes the form of a process that includes (a) obtaining a plurality of RSSI values respectively associated with frames in a plurality of frames that were (i) received by various access points in a plurality of access points and (ii) transmitted by a client device that is connected to a first access point in the plurality of access points, (b) segmenting the access points in the plurality of access points into a beamforming-path set of one or more access points and a non-beamforming-path set of one or more access points, wherein the beamforming-path set includes the first access point, (c) identifying a location-determination subset of the obtained RSSI values at least in part by including in the location-determination subset the RSSI values respectively associated with the frames in the plurality of frames that were received by the one or more access points in the non-beamforming-path set; and (d) determining a location of the client device using the identified location-determination subset of the obtained RSSI values.

Another embodiment takes the form of a system that includes a wireless-communication interface, a processor, and data storage containing instructions executable by the processor for causing the system to carry out at least the functions described in the preceding paragraph.

Moreover, any of the variations and permutations described in the ensuing paragraphs and anywhere else herein can by implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and or characterize such embodiments.

In at least one embodiment, the process is carried out periodically.

In at least one embodiment, the process is carried out responsive to determining that the client device is a beamforming client device.

In at least one embodiment, the process is carried out responsive to determining that the client device has initially connected to the first access point.

In at least one embodiment, a first RSSI value in the plurality of obtained RSSI values is associated with one or more frames that were received by the first access point, and the beamforming path set further includes any access points in the plurality of access points that received frames in the plurality of frames having associated RSSI values in the plurality of obtained RSSI values that are within an RSSI threshold of the first RSSI value. In at least one such embodiment, the RSSI threshold is less than or equal to 5 dB; in at least one such embodiment, the frames in the plurality of frames that were received by the one or more access points in the beamforming-path set include an omnidirectional subset of frames and identifying the location-determination subset of the obtained RSSI values further includes including in the location-determination subset the RSSI values respectively associated with the frames in the omnidirectional subset of frames. In one such embodiment that includes an omnidirectional subset of frames, the omnidirectional subset of frames includes sounding frames; in another such embodiment, the omnidirectional subset of frames consists of sounding frames. In one such embodiment that includes identifying the location-determination subset of the obtained RSSI values, identifying the location-determination subset of the obtained RSSI values includes confirming that the beamforming-path set includes at least a first number of access points prior to including in the location-determination subset the RSSI values respectively associated with the frames in the omnidirectional subset of frames.

In one embodiment, the frames in the plurality of frames that were received by the one or more access points in the beamforming-path set include an omnidirectional subset of frames, and identifying the location-determination subset of the obtained RSSI values further includes including in the location-determination subset the RSSI values respectively associated with the frames in the omnidirectional subset of frames. In one such embodiment that includes an omnidirectional subset of frames, the omnidirectional subset of frames includes sounding frames; in another such embodiment, the omnidirectional subset of frames consists of sounding frames. In one such embodiment that includes identifying the location-determination subset of the obtained RSSI values, identifying the location-determination subset of the obtained RSSI values includes confirming that the beamforming-path set includes at least a first number of access points prior to including in the location-determination subset the RSSI values respectively associated with the frames in the omnidirectional subset of frames.

In one embodiment, identifying the location-determination subset of the obtained RSSI values consists of including in the location-determination subset the RSSI values respectively associated with the frames in the plurality of frames that were received by the one or more access points in the non-beamforming-path set, the method further includes confirming that the non-beamforming-path set includes at least a minimum number of access points. In one such embodiment, the minimum number is three.

In one embodiment, obtaining the plurality of RSSI values includes measuring at least one of the RSSI values.

In one embodiment, obtaining the plurality of RSSI values includes receiving at least one of the RSSI values via a communication interface.

In one embodiment, the process further includes caching at least one non-beamformed RSSI fingerprint of the client device, and determining the location of the client device using the identified location-determination subset of the obtained RSSI values includes comparing the at least one cached non-beamformed RSSI fingerprint of the client device with one or more of the obtained RSSI values in the identified location-determination subset.

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . " And it is for reasons akin to brevity and clarity of presentation that this implied leading clause is not repeated ad nauseum in this detailed description.

FIG. 1 is a schematic of a wireless network, in accordance with some embodiments. In particular, FIG. 1 depicts an example communication system 100 that includes base stations 102a-d, client devices 104a-d, a radio access network 106, a data network 108, and communication links 110-130.

Each of the base stations 102a-d may be any wireless base station configured to receive and transmit wireless communication signals. Example bases stations include Wi-Fi routers, access points, wireless telephone systems, trunked radios, base transceiver stations, eNodeBs, and the like. These terms may be used interchangeably throughout the disclosure. Each base station 102a-d may be configured to operate per any wireless-communication standard, some examples including Wi-Fi, Bluetooth, CDMA, GSM, and the like.

Each of the client devices 104a-d may be any wireless-communication device configured to receive and transmit wireless communication signals. Example client devices include mobile phones, smart phones, tablet computers, radios, smart watches, and the like.

The radio access network 106 may include one or more packet-switched networks and/or one or more circuit-switched networks, and in general functions to provide users of client devices with a variety of computing and communication services. In the depicted embodiment, the radio access network 106 is configured to communicate with the data network 108, which may be, include, or be a part of the global network of networks typically referred to as the Internet. The data network 108 may be a packet-switched network, and entities (i.e., servers, routers, computers, and the like) that communicate over the data network 108 may be identified by respective network addresses such as Internet Protocol (IP) addresses. Moreover, the data network 108 may include one or more network access servers (NASs), gateways, and the like for bridging communications to one or more other entities and/or networks, such as the radio access network 106. And certainly other example arrangements and configurations could be described here with respect to the radio access network 106 and/or the data network 108.

Any one or more of the communication links 110-130 could be communication links between one or more client devices, one or more base stations, and/or one or more networks. The communication links 110-126 are depicted with respective lightning-bolt graphics; while this graphic typically denotes wireless communication, and does in this example as well, this is not to the exclusion of one or more of the other communication links 128-130 being or at least including wireless-communication links as well.

The communication links 110-130 are configured to convey data from, to, between, and among the components depicted, including but not limited to between the base stations 102a-d, the client devices 104a-d, the radio access network 106, and the data network 108. As but one example, the client device 104a is in communication with the base station 102a via the communication link 120. As another example, the client device 104b is in communication with the base station 102a via the communication link 114, the base station 102b via the communication link 122, the radio access network 106 via the communication link 112, and the client device 104c via the communication link 116. And certainly other embodiments could be described here, and each individual base station 102a-d and each individual client device 104a-d may be configured to communicate with as many or as few other entities as deemed suitable by those with skill in the art for a given implementation or in a given context. In at least one embodiment, the base stations 102a-d are Wi-Fi access points and the communication links 114, 118, 120, and 122 are Wi-Fi communication links. In at least one embodiment, the client-device-to-client-device communication link 116 uses Bluetooth® technology. In at least one embodiment, at least one client device communicates simultaneously with multiple base stations; such an arrangement is depicted by way of example in FIG. 1 with respect to the client device 104b simultaneously communicating (i) over the communication link 114 with the base station 102a and (ii) over the communication link 122 with the base station 102b. Moreover, in at least one embodiment, at least one base station communicates simultaneously with multiple client devices; such an arrangement is depicted by way of example in FIG. 1 with respect to the base station 102*a* simultaneously communicating (i) over the communication link 114 with the client device 104*b* and (ii) over the communication link 120 with the client device 104*a*.

Figure 4:
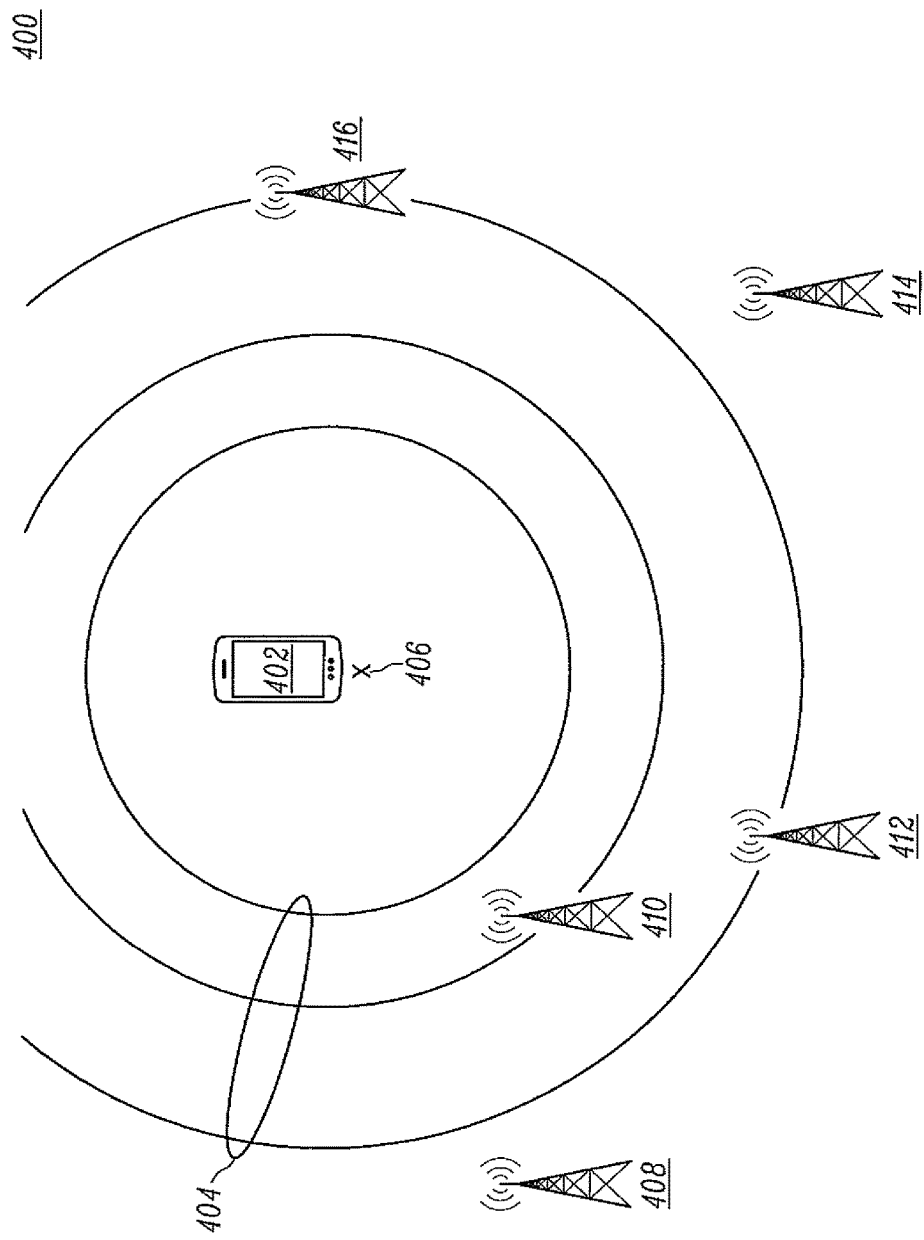
FIG. 4 is a first schematic of a wireless infrastructure, in accordance with some embodiments.
Figure 5:
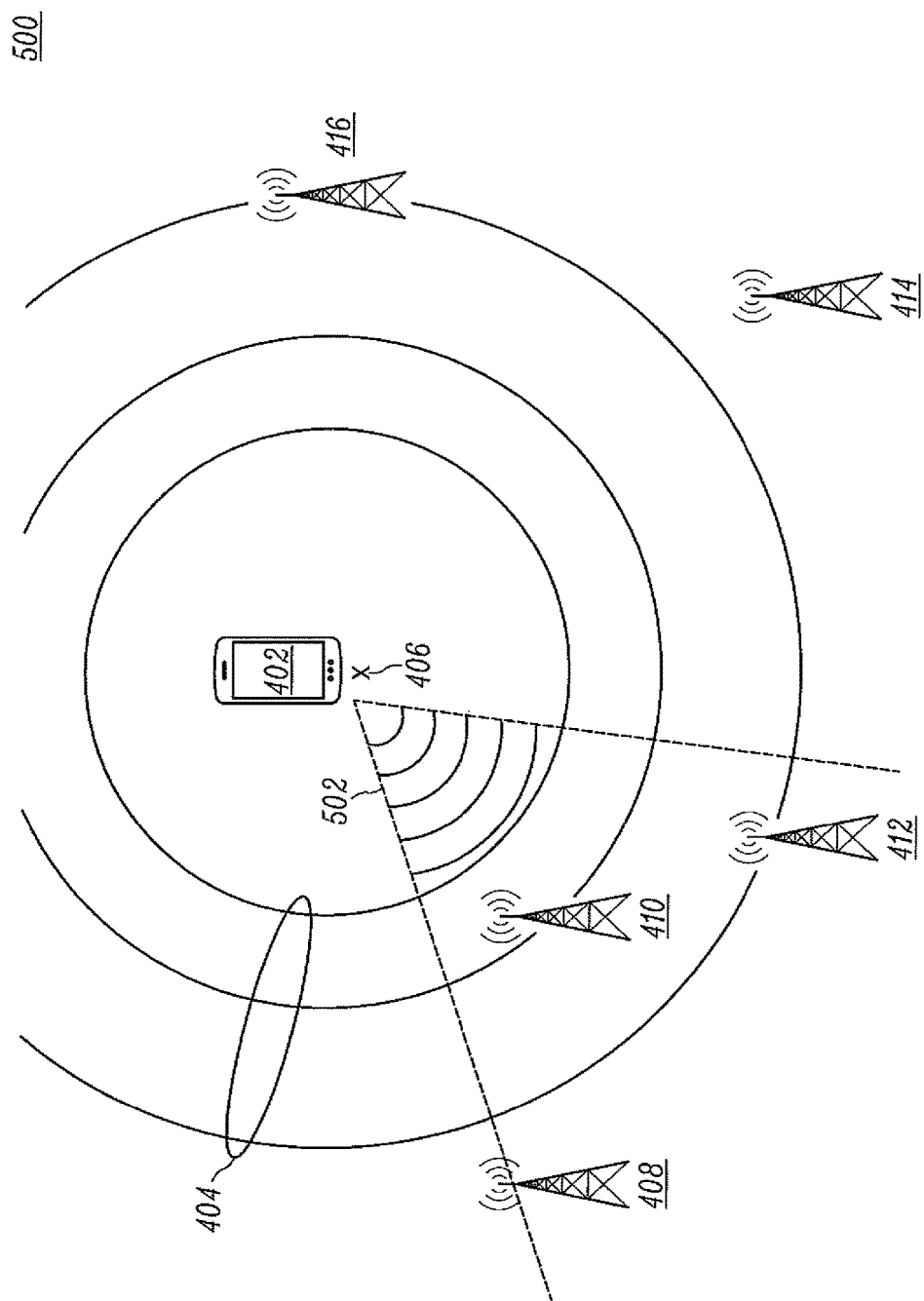
FIG. 5 is a second schematic of a wireless infrastructure, in accordance with some embodiments.
Figure 6:
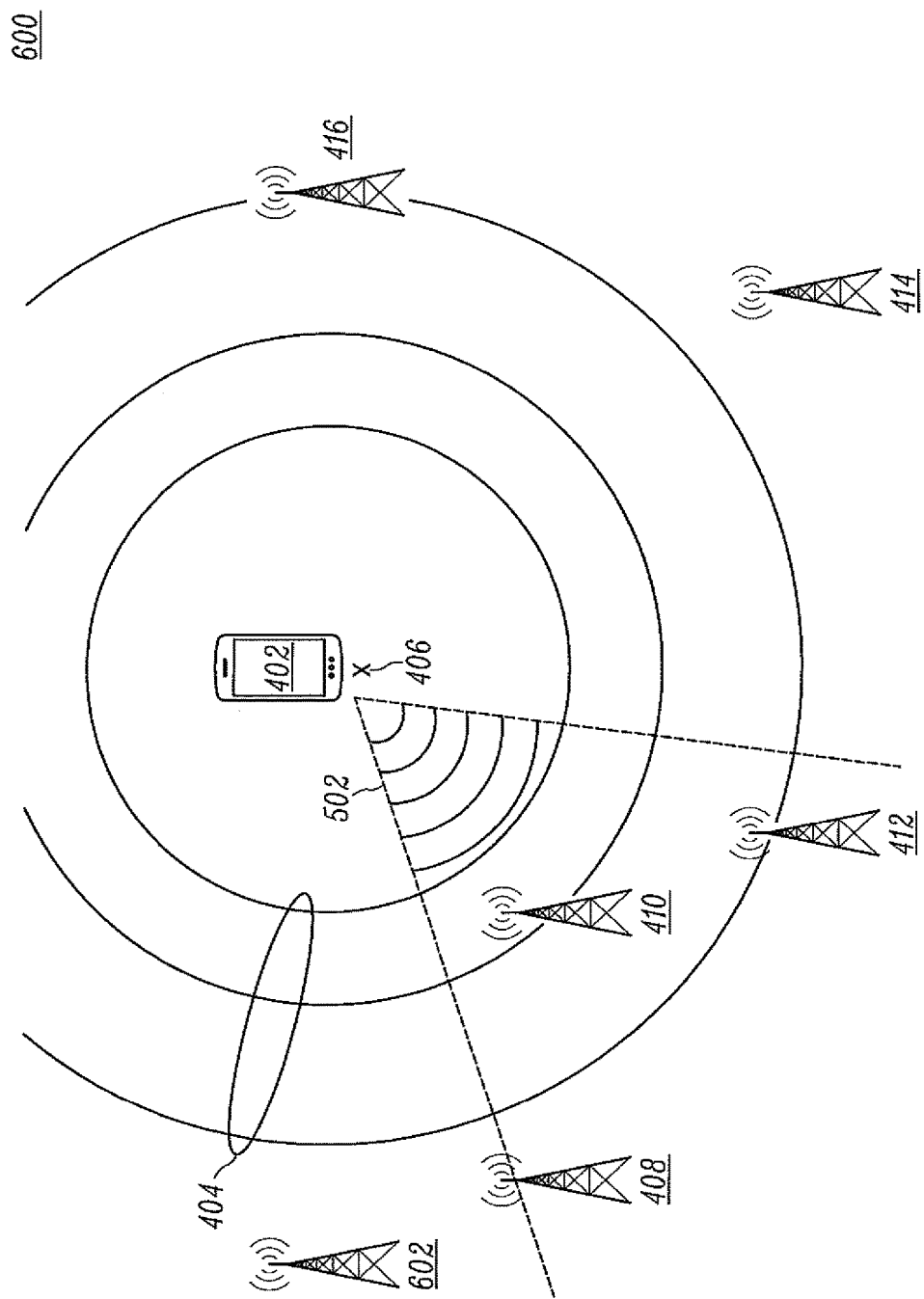
FIG. 6 is a third schematic of a wireless infrastructure, in accordance with some embodiments.

The communication system 100 provides an example context for description of various aspects of this disclosure, including the communication schemes depicted in FIGS. 4-6. The quantity, placement, and configuration of the components may vary, as deemed suitable by those with skill in the art for a given implementation or in a given context. Moreover, while FIGS. 4-6 depict various communication schemes, for clarity, not all aspects of the communication system 100 are depicted and described herein.

Figure 2:
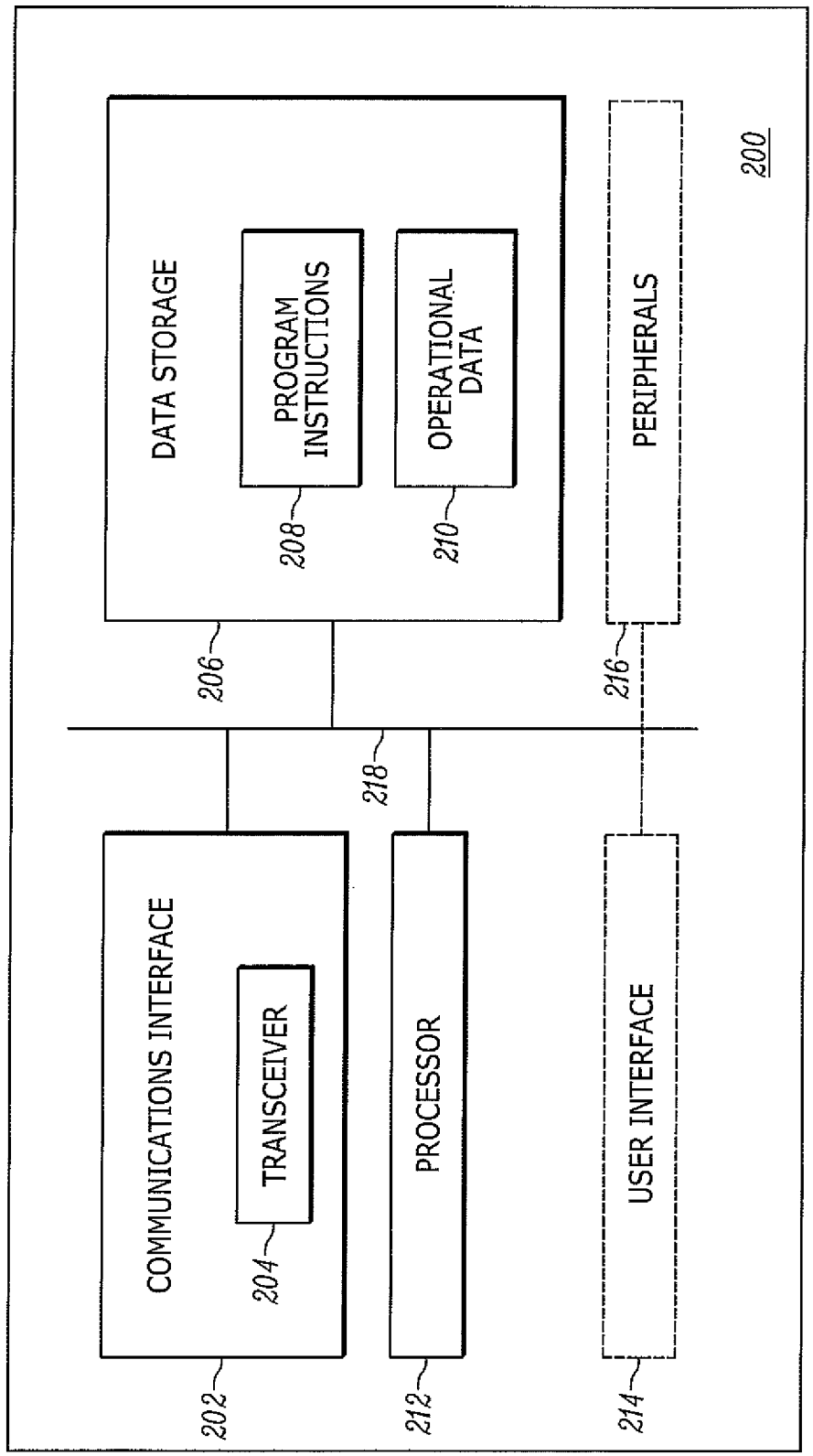
FIG. 2 is a block diagram of an example computing device, in accordance with some embodiments.

FIG. 2 is a block diagram of an example computing device, in accordance with some embodiments. In particular, FIG. 2 depicts an example computing device 200, which may be configured to act as any of the base stations 102*a-d* depicted in FIG. 1, any of the client devices 104*a-d* depicted in FIG. 1, or any other computer or network entity disclosed herein. The example computing device 200 includes a communications interface 202 (that includes a transceiver 204), data storage 206 (that contains program instructions 208 and operational data 210), a processor 212, an optional user interface 214, optional peripherals 216, and a communication bus 218. This arrangement is presented by way of example and not limitation, as other example arrangements could be described here.

As stated above, the communication interface 202 includes the transceiver 204. The transceiver 204 may be configured (e.g., tuned) to receive and transmit on one of a set of channels. The transceiver 204 may be a single component, or realized as a separate transmitter and receiver, as known by those with skill in the art. The communication interface 202 may be configured to be operable for communication according to one or more wireless-communication protocols, some examples of which include LMR, LTE, APCO P25, ETSI DMR, TETRA, Wi-Fi, Bluetooth, and the like. The communication interface 202 may also include one or more wired-communication interfaces (for communication according to, e.g., Ethernet, USB, and/or one or more other protocols.) The communication interface 202 may include any necessary hardware (e.g., chipsets, antennas, Ethernet interfaces, etc.), any necessary firmware, and any necessary software for conducting one or more forms of communication with one or more other entities as described herein.

The transceiver 204 may further be configured to transmit frames in both omnidirectional and beamformed modes. The frames transmitted by the transceiver 204 comprise electronic data. In the omnidirectional mode, the transceiver 204 transmits frames in all directions. In a beamforming mode, the transceiver 204 transmits frames in at least one focused direction along a beamformed path at a higher strength than it transmits in other directions. The result of the beamformed transmission is that the transmission has a higher signal strength in the direction of the beamformed path than if the transmission occurred as an omnidirectional transmission. For the purposes of this disclosure, an omnidirectional transmission is the same as a non-beamformed transmission.

The direction of the beamformed path may be in the direction of a receiving computing device. For example, in the communication system 100 described in FIG. 1, the client device 104*c* may be connected to the base station 102*d* via the communication link 118. The client device 104*c* may transmit in a beamformed mode in the direction of the base station 102*d* along the communication link 118.

The data storage 206 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. As depicted in FIG. 2, the data storage 206 contains program instructions 208 executable by the processor 212 for carrying out various functions described herein, and further is depicted as containing and operational data 210, which may include any one or more data values stored by and/or accessed by the computing device in carrying out one or more of the functions described herein.

The processor 212 may include one or more processors of any type deemed suitable by those of skill in the relevant art, some examples including a general-purpose microprocessor and a dedicated digital signal processor (DSP).

If present, the user interface 214 may include one or more input devices (a.k.a. components and the like) and/or one or more output devices (a.k.a. components and the like.) With respect to input devices, the user interface 214 may include one or more touchscreens, buttons, switches, microphones, and the like. With respect to output devices, the user interface 214 may include one or more displays, speakers, light emitting diodes (LEDs), and the like. Moreover, one or more components (e.g., an interactive touchscreen and display of the user interface 214 could provide both user-input and user-output functionality. Other user interface components could also be present, as known to those of skill in the art. In some embodiments, the computing device does not include a user interface.

If present, the peripherals 216 may include any computing device accessory, component, or the like, that is accessible to and useable by the computing device during operation. Example peripherals 216 include a GPS receiver, an altimeter, an RSSI sensor, and the like. In some embodiments, the computing device does not include peripherals.

The various component of the computing device 200 are all communicatively coupled with one another via a communication bus 218 (or other suitable communication network, or the like.)

Figure 3:
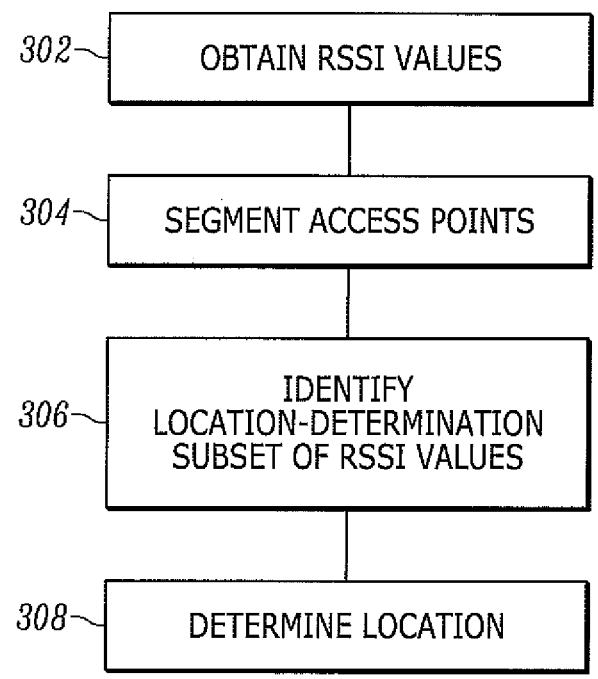
FIG. 3 is a flowchart of an example process, in accordance with some embodiments.

FIG. 3 is a flowchart of an example process, in accordance with some embodiments. In particular, FIG. 3 depicts a process 300, which includes obtaining RSSI values at step 302, segmenting access points at step 304, identifying a location-determination subset of RSSI values at step 306, and determining a location at step 308. Each of these steps is described more fully below. The process 300 may be carried out in the context of the wireless system 100. In various different embodiments, the process 300 may be carried out by one or more of the base stations 102*a-d*, one or more computing devices (e.g., servers) connected to the radio access network 106, one or more computing devices (e.g., servers) connected to the data network 108, and/or one or more other suitable computing devices deemed suitable by those of skill in the art for a given implementation or in a given context.

In accordance with an embodiment, step 302 of the process 300 includes obtaining a plurality of RSSI values respectively associated with frames in a plurality of frames that were (i) received by various access points in a plurality of access points and (ii) transmitted by a client device that is connected to a first access point in the plurality of access points. In accordance with an embodiment, step 304 of the process 300 includes segmenting the access points in the plurality of access points into (i) a beamforming-path set of one or more access points and (i) a non-beamforming-path set of one or more access points, wherein the beamforming-path set includes the first access point. In accordance with an embodiment, step 306 of the process 300 includes identifying a location-determination subset of the obtained RSSI values at least in part by including in the location-determination subset the RSSI values respectively associated with the frames in the plurality of frames that were received by the one or more access points in the non-beamforming-path set. In accordance with an embodiment, step 308 of the process 300 includes determining a location of the client device using the identified location-determination subset of the obtained RSSI values.

In at least one embodiment, the process 300 is carried out periodically. For example, the process 300, or any other process described herein, could be carried out periodically on a set schedule, after a set duration, or according to another period, as known by those with skill in the art.

In at least one embodiment, the process 300 is carried out responsive to determining that the client device that is being located is a beamforming client device. For example, before the process 300 is performed, the client device that is being located may be identified as a beamforming-capable client device, and the process 300 is then responsively performed.

In at least one embodiment, the process 300 is carried out responsive to determining that the client device has initially connected to the above-mentioned first access point. For example, before the process 300 is performed, the client device initially connects to the first access point, and the process 300 is then responsively performed.

Moreover, various different combinations of the described embodiments may be performed. For example, in accordance with an embodiment, a client device may be determined to be a beamforming client that initially connects to a first access point, after which the process 300 may be responsively performed periodically. And certainly numerous other example combinations of described embodiments could be listed here as well.

FIGS. 4-6 depict various schematics of wireless infrastructures, in accordance with some embodiments. FIGS. 4-6 represent arrangements that may be present in the context of the communication system 100 that is depicted in FIG. 1.

FIG. 4 is a first schematic of a wireless infrastructure, in accordance with some embodiments. In particular, FIG. 4 depicts a schematic of a wireless infrastructure 400, which includes a client device 402 that is emitting an omnidirectional wireless transmission 404 from a client-device position 406, and that further includes access points (i.e., base stations) 408-416.

In an embodiment, the client device 402 is configured to transmit the omnidirectional transmission 404 and is located at the client-device position 406. The omnidirectional transmission 404 is depicted as three concentric rings, indicating that the strength of the wireless transmission 404 is essentially equal in all directions from the client device 402. The strength of the omnidirectional transmission 404 is at its highest closest to the client-device position 406 and weakens as the range extends away from the client-device position 406. The client device 402 may have a communication link with any of the access points 408-416, however, in the depicted and described example, all of the access points 408-416 have the ability to detect the omnidirectional transmission 404.

In the depicted and described example, in which equal propagation of the omnidirectional signal 404 is occurring, the access point 410 detects the highest signal strength, access points 412 and 416 detect equal signal strength (but weaker than the signal strength detected by access point 410), and access points 408 and 414 detect the weakest signal strength. The access points 408-416 are configured to measure the signal strength of the omnidirectional transmission 404. The measurement of the signal strength may be measured as an RSSI value of a certain dB level The access points 408-416 may be configured to transmit the measured RSSI value to each of the other access points, a network server, a data network, one or more client devices, and/or any other device or devices deemed suitable by those having skill in relevant art for a given implementation or in a given context. The client-device position 406 may be determined, in part, by the measured RSSI values, as compared to historical or cached RSSI values, as known by those with skill in the art.

FIG. 5 is a second schematic of a wireless infrastructure, in accordance with some embodiments. In particular, FIG. 5 depicts a schematic of a wireless infrastructure 500, which includes the same elements as the wireless infrastructure 400 depicted in FIG. 4, and further includes a beamformed transmission 502 being emitted by the client device 402, which is configured in the depicted and described embodiment to transmit frames via the beamformed transmission 502. In contrast with the omnidirectional transmission 404, which has the same strength in every direction, the strength of the beamformed transmission 502 is disproportionately higher along the beamformed path (extending down and to the left between the dashed lines) than in other directions.

The wireless infrastructure 500 is a useful context for describing several examples. In a first example, the process 300 is performed when the client device 402, located at client-device location 406, transmits a plurality of frames to the access point 410. A frame in the plurality of frames is detected by the access points 408-416. Each access point determines an RSSI value for the frame associated with the frame transmitted by the client device 402 to the access point 410. A component in the network (e.g., a network entity, one of the access points, or one of the client devices, or the like) obtains the plurality of RSSI values respectively associated with the frames in the plurality of frames.

The entity (e.g., server) that is carrying out the process 300 segments the access points into (i) a beamforming-path set of one or more access points and (ii) a non-beamforming path set of one or more access points, where the beamforming-path set includes the access point 410 to which the client device 402 is directing the beamformed transmission 502. Thus, here, the access point 410 is segmented into the beamforming-path set of access points because the client device 402 is transmitting frames to the access point 410 using the beamformed transmission 502. In this example, the access points 408, and 412-416 are segmented into the non-beamforming-path set of one or more access points.

Next, in this first example, a location-determination subset of the obtained RSSI values is identified at least in part by including in the location-determination subset the RSSI values respectively associated with the frames in the plurality of frames that were received by the one or more access points in the non-beamforming-path set. Here, the location-determination subset of RSSI values is made up of the RSSI values detected by the access points 408 and 412-416. Further to this first example, the client-device location 406 is determined using the identified location-determination subset of the obtained RSSI values. Here, the location of client device 402 is determined using the RSSI values detected by the access points 408 and 412-416, and not the RSSI value detected by the access point 410.

In accordance with a second example, the beamforming-path set of one or more access points further includes any access points that received frames having RSSI values that are within an RSSI threshold of the RSSI value of the frame that was received via the access point 410. In this second example, the server carrying out the process 300 determines the RSSI value associated with the transmission that was received by the access point 410 from the client device 402. That RSSI value is then compared to the RSSI values of the frames detected by the other access points. Access points that detected an RSSI value (associated with a transmission from the client device 402) within a threshold of the RSSI value detected by the access point 410 are added to the beamforming-path set; thus, the RSSI values of frames that were detected by those access points are not included in the location-determination set of RSSI values; as such, the location of the client device 402 is not determined based on those RSSI values.

In one such embodiment, the RSSI threshold is 5 dB. However, the threshold may be set to any number deemed suitable by those with skill in the art for a given implementation or in a given context. Example threshold values include 1 dB, 3 dB, 7 dB, and certainly others.

In a third example, the frames that were received by the one or more access points in the beamforming-path set include an omnidirectional subset of frames; furthermore, in this third example, the server (or other entity) carrying out the process 300 includes in the location-determination subset the RSSI values respectively associated with the frames in that omnidirectional subset of frames. Thus, in this third example, the client device 402 transmits a plurality of frames, including some frames as part of the omnidirectional transmission 404 and other frames as part of the beamformed transmission 502. The frames in the omnidirectional transmission 404 can be detected based on the timing and/or content of the frame. For example, in accordance with various wireless standards, the client device 402 may transmit a sounding frame (e.g., an NDP sounding frame) as a precursor to transmitting a beamformed frame. Based on the characteristics (e.g., content, timing, and/or the like) of the received frame, an access point can recognize a given received frame as being a sounding frame, and thus the obtained RSSI values of frames identified as sounding frames are, in this third example, included in the location-determination subset of the obtained RSSI values. In one embodiment, the omnidirectional subset of frames includes sounding frames. In one embodiment, the omnidirectional subset of frames consists of, or only includes, sounding frames.

In a fourth example, the client device 402 transmits a plurality of frames to the access point 410, including omnidirectional frames and beamformed frames. The plurality of frames are detected by the access points 408-416. The RSSI values obtained in this fourth example by each of the access points associated with the transmissions from the client device 402 is summarized in Table 1 below.

TABLE 1

RSSI Values Detected by Access Points

| Access Point | Beamformed Transmission RSSI Value | Omnidirectional Transmission RSSI Value |
| --- | --- | --- |
| 408 | 16 dB | 3 dB |
| 410 | 20 dB | 10 dB |
| 412 | 18 dB | 5 dB |
| 414 | 3 dB | 5 dB |
| 416 | 1 dB | 3 dB |

In this fourth example, the server (or other entity) that is carrying out the process 300 segments these access points into a beamforming-path set and a non-beamforming-path set. The beamforming-path set includes the access point 410, which is the access point to which the client device 402 is directing the beamformed transmission 502. The obtained RSSI values associated with beamformed transmissions detected by the other access points are compared to the RSSI value associated with the beamformed transmission detected by the access point 410. In this fourth example, the RSSI threshold is 5 dB, and accordingly the access points 408 and 412 are also included in the beamforming-path set, as the RSSI values (16 dB and 18 dB, respectively) of beamformed transmissions detected by the access points 408 and 412 are within 5 dB of the RSSI value (20 dB) of the beamformed transmission detected by the access point 410.

Further, the access points also detect the omnidirectional transmission, which may be a sounding-NDP frame transmission. The RSSI values of the detected omnidirectional subset of frames is then included in the location-determination subset of the obtained RSSI values.

Thus, in this fourth example, the identified location-determination subset of RSSI values includes (i) the RSSI values detected by access points in the non-beamforming set of access points (3 dB and 1 dB from the access points 414 and 416, respectively), and (ii) the RSSI values of the omnidirectional subset (3 dB, 10 dB, 5 dB, 5 dB, and 3 dB from access points 408, 410, 412, 414, and 416, respectively).

In one embodiment, identifying the location-determination subset of the obtained RSSI values further comprises confirming that the beamforming-path set includes at least a first number (e.g., 3) of access points prior to including the RSSI vales respectively associated with the frames in the omnidirectional subset of frames in the location-determination subset. In such an embodiment, the previous example would involve first confirming the presence of a minimum number (e.g., 3) of access points in the beamforming-path set (here the 3 access points 408, 410, and 412) before adding the RSSI values of the omnidirectional subset to the location-determination subset of RSSI values.

FIG. 6 is a third schematic of a wireless infrastructure, in accordance with some embodiments. In particular, FIG. 6 depicts a wireless infrastructure 600, which includes the same elements as the wireless infrastructure 500 depicted in FIG. 5, and further includes an access point 602, which in an embodiment is similar to the other access points discussed herein. In accordance with an embodiment that is carried out in the context of the wireless infrastructure 600 of FIG. 6, the server (or other entity) that is carrying out the process 300 confirms that the non-beamforming-path set of access points includes at least a minimum number of access points; in some such embodiments, that minimum number is 3.

In FIG. 6, the access point 602 receives the transmissions from the client device 402. If the RSSI value of the beamformed transmission 502 as received by the access point 602 is within the threshold of the RSSI value of the beamformed transmission as received by the access point 410, then the access point 602 is segmented into the beamforming-path set of access points, otherwise to the non-beamforming-path set of access points. Since the access point 602 is located outside of the direction of the beamformed transmission 502, it is assumed here for purposes of example explanation that the RSSI value of the beamformed transmission 502 as received by the access point 602 will be similar to that detected by the access point 414, and thus that the access point 602 will be included in the non-beamforming set of access points. This assumption raises the number of access points in the non-beamforming set to 3. In embodiments in which at least 3 access points must be present in the non-beamforming set in order to carry out the process 300, the arrangement depicted in FIG. 6 and described by way of example here would satisfy this condition, and the process 300 would accordingly be carried out.

In one embodiment, obtaining the plurality of RSSI values includes measuring at least one of the RSSI values. The RSSI values may be measured using one of the peripherals associated with the access point, such as an RSSI sensor.

In one embodiment, obtaining the plurality of RSSI values includes receiving at least one of the RSSI values via a communication interface. The RSSI values detected by various access points may be transmitted and relayed from one network entity to another.

In one embodiment, the process 300 further includes caching at least one non-beamformed RSSI fingerprint of the client device 402, and determining the location of the client device 402 using the identified location-determination subset of the obtained RSSI values includes comparing the at least one cached non-beamformed RSSI fingerprint of the client device with one or more of the obtained RSSI values in the identified location-determination subset. In one embodiment, the non-beamformed RSSI fingerprint of the client device includes RSSI values in the location-determination subset of RSSI values.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
obtaining a plurality of signal strength indicator (RSSI) values associated with a plurality of frames that were (i) received by a plurality of access points and (ii) transmitted by a client device in communication with the plurality of access points, wherein the plurality of access points comprise a first type of access points and a second type of access points, wherein the first type of access points include a first type access point that receives one or more first type frames from a beamforming signal transmitted by the client device, and wherein the second type of access points include a plurality of second type access points that each receives one or more second type frames from a non-beamforming signal transmitted by the client device;
segmenting the plurality of access points into the first type of access points or the second type of access points;
identifying a subset of the plurality of RSSI values that are associated with one or more second type frames received by the plurality of second type access points, wherein the subset of the plurality of RSSI values associated with the one or more frames received by the plurality of second type access points is less than the plurality of RSSI values associated with the plurality of frames received by the plurality of access points including the first type access points and the plurality of second type access points; and
determining a location of the client device based on the RSSI values associated with the plurality of second type frames received by the plurality of second type access points.

2. The method of claim 1, wherein the obtaining of the plurality of RSSI values is performed periodically.

3. The method of claim 1, further comprising:
determining that the client device is a beamforming client device,
wherein the obtaining of the plurality of RSSI values is in response to determining that the client device is the beamforming client device.

4. The method of claim 1, further comprising:
determining that the client device has initially connected to the first type access point,
wherein the obtaining of the plurality of RSSI values is in response to determining that the client device has initially connected to the first type access point.

5. The method of claim 1, further comprising:
identifying a RSSI value of the plurality of RSSI values that is associated with the one or more first type frames received by the first type access point; and
determining if the RSSI value associated with the first type access point is less than or equal to a RSSI threshold associated with the first type of access points,
wherein the determining of the location of the client device is further based on the RSSI value associated with the first type access point when the RSSI value associated with the first type access point is less than or equal to the RSSI threshold associated with the first type of access points.

6. The method of claim 5, wherein the RSSI threshold is 5 dB.

7. The method of claim 5, wherein the one or more first type frames received from the client device transmitting the beamforming signal comprises an omnidirectional subset of frames.

8. The method of claim 7, wherein the omnidirectional subset of frames comprises sounding frames.

9. The method of claim 7, wherein the identifying of the RSSI value associated with the one or more frames received by the first type access point comprises identifying the first RSSI value associated with the omnidirectional subset of frames.

10. The method of claim 9, further comprising:
confirming that the first type of access points includes a minimum of first type access points,
wherein the confirming of the first type of access points is performed prior to the identifying of the first RSSI value being associated with the omnidirectional subset of frames.

11. The method of claim 1, additionally comprising:
identifying a RSSI value of the plurality of RSSI values that is associated with the one or more first type frames received by the first type access point; and
determining if the RSSI value associated the first type access point is within a predetermined range of a RSSI value associated with the first type of access points,
wherein the determining of the location of the client device is further based on the RSSI value associated with the first type access point when the RSSI value associated with the first type access point is within the predetermined range of the RSSI value associated with the first type of access points.

12. The method of claim 11, wherein the one or more first type frames received from the client device transmitting the beamforming signal comprises an omnidirectional subset of frames.

13. The method of claim 11, wherein the predetermined range is 5 dB and the RSSI value associated with the first type of access points is 20 dB.

14. The method of claim 11, further comprising:
confirming that the first type of access points includes a minimum number of first type access points.

15. The method of claim 1, further comprising:
confirming that the plurality of second type access points includes a minimum number of second type access points.

16. The method of claim 15, wherein the minimum number of second type access points is 3.

17. The method of claim 1, wherein the obtaining of the plurality of RSSI values comprises measuring at least one of the plurality of RSSI values.

18. The method of claim 1, wherein the obtaining of the plurality of RSSI values comprises receiving at least one of the plurality of RSSI values via a communication interface.

19. The method of claim 1, further comprising:
caching at least one fingerprint of the subset of RSSI values associated with at least one of the plurality of second type frames received from the second type of access points and transmitted via the non-beamforming signal of the client device,
wherein the determining of the location of the client device comprises comparing the at least one fingerprint with one or more of the subset of the RSSI values.

20. A system, comprising:
a communication interface;
a processor; and
data storage containing instructions executable by the processor for causing the system to carry out a set of functions, the set of functions including:
obtaining a plurality of signal strength indicator (RSSI) values associated with a plurality of frames that were (i) received by a plurality of access points and (ii) transmitted by a client device in communication with the plurality of access points, wherein the plurality of access points comprise a first type of access points and a second type of access points, wherein the first type of access points include a first type access point that receives one or more first type frames from a beamforming signal transmitted by the client device, and wherein the second type of access points include a plurality of second type access points that each receive one or more second type frames from a non-beamforming signal transmitted by the client device;
segmenting the plurality of access points into the first type of access points or a second type of access points;
identifying a subset of the plurality of RSSI values that are associated with the one or more second type frames received by the plurality of second type access points, wherein the subset of the plurality of RSSI values associated with the one or more frames received by the plurality of second type access points is less than the plurality of RSSI values associated with the plurality of frames received by the plurality of access points including the first type access points and the plurality of second type access points; and
determining a location of the client device based on the RSSI values associated with the plurality of second type frames received by the plurality of second type access points.

21. The method of claim 11, wherein the segmenting of the plurality of access points is based on the determining if the first RSSI value associated with the first type access point is within the predetermined range of the RSSI value associated with the first type of access points.

22. The method of claim 12, wherein the omnidirectional subset of frames comprises sounding frames.

23. The method of claim 14, wherein the identifying of the RSSI value associated with the one or more first type frames received by the plurality of second type access points is based on the conforming that the first type of access points includes a minimum number of first type access points.

24. The method of claim 23, wherein the segmenting of the plurality of access points comprises:
if the RSSI value associated with the first type access point is within the predetermined range of the RSSI value associated with the first type of access points, categorizing each of the plurality of access points as the first type of access points; and
if the RSSI value associated with the first type access point is not within the predetermined range of the RSSI value associated with the second type of access points, categorizing each of the plurality of access points as the first type of access points.

* * * * *